(12) United States Patent
Wong et al.

(10) Patent No.: US 6,685,903 B2
(45) Date of Patent: Feb. 3, 2004

(54) METHOD OF PURIFYING AND RECYCLING ARGON

(75) Inventors: Kenneth K. Wong, Amherst, NY (US); Dante Patrick Bonaquist, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 211 days.

(21) Appl. No.: 09/725,778

(22) Filed: Mar. 1, 2001

(65) Prior Publication Data

US 2002/0141925 A1 Oct. 3, 2002

(51) Int. Cl.[7] .............................. C01B 23/00; F25J 3/00
(52) U.S. Cl. .................. 423/262; 423/241; 423/240 S; 423/220; 423/248; 423/219; 423/210; 62/924; 95/132
(58) Field of Search ................................ 423/210, 219, 423/247, 248, 262, 241, 240 S, 220, 235; 62/632, 636, 924, 617; 95/132, 131, 139, 117

(56) References Cited

U.S. PATENT DOCUMENTS

| | | | |
|---|---|---|---|
| 4,338,108 A | * | 7/1982 | Isalski et al. .................. 62/622 |
| 4,752,311 A | * | 6/1988 | MacLean et al. .............. 62/624 |
| 5,220,797 A | * | 6/1993 | Krishnamurthy et al. ..... 62/620 |
| 5,399,246 A | * | 3/1995 | Joshi ........................... 205/765 |
| 5,730,003 A | * | 3/1998 | Nguyen et al. ................ 62/648 |

OTHER PUBLICATIONS

O'Brien et al, "The Recovery and Recylcing of High Purity Argon in the Semiconductor Industry", AIChE 1988 Spring National meeting, New Orleans, LA, Mar. 1988.*
Felder et al, "Elementary Principles of Chemical Processes", p. 106, 1978 (no month).*

* cited by examiner

*Primary Examiner*—Ngoc-Yen Nguyen
(74) *Attorney, Agent, or Firm*—Stanley Ktorides

(57) ABSTRACT

This invention is directed to a method for purifying argon from an impure argon stream. If the oxygen concentration in the impure argon is less than about 10 mole percent of oxygen, the invention is proceeded in the sequential steps of a) removing chlorine from the impure argon stream; b) adding hydrogen to the impure argon stream; c) removing carbon dioxide and water from the impure argon stream; d) removing hydrogen from the impure argon stream; and e) removing nitrogen from the impure argon stream to form a purified argon stream. If the oxygen concentration in the impure argon is greater than about 10 mole percent of oxygen, the method comprises the sequential steps of a) removing chlorine from the impure argon stream; b) removing carbon dioxide and water from the impure argon stream; c) removing nitrogen and oxygen from the impure argon stream; d) adding hydrogen to the impure argon stream; e) removing water from the impure argon stream; f) removing hydrogen from the impure argon stream; and g) removing nitrogen from the impure argon stream to form a purified stream.

9 Claims, 4 Drawing Sheets

METHOD OF PURIFYING AND RECYCLING ARGON

FIELD OF THE INVENTION

This invention is generally related to a method for purifying a gas. More specifically, this invention is related to a method for purifying and recycling argon.

BACKGROUND OF THE INVENTION

Argon is employed in various processes wherein its chemically inert nature, specific physical properties, and a cost that is low relative to those of other noble gases make its use particularly advantageous. For example, argon is used as a blanketing or purge gas, as a heat transfer medium, for degassing of reactive impurities in various metal processes operations, for the atomizing molten steel into the fine powder, and for the production of optical fiber related products.

While argon is present in air at a much higher concentration than those of the other noble gases, and considerable volumes of argon are available as byproduct of oxygen and nitrogen by air separation, the cost of argon still provides significant incentive toward maximizing recycle usage. Therefore, systems have been commercially implemented to conserve argon by means of pressure, equalization between vessels, recompression and recycle, generally with particulate separation.

Argon inerting streams become contaminated with impurities during processing. These impurities generally prevent the inerting stream from being reused. Purifying the rich argon streams will allow for the reclamation of the argon. Certain inerting environments found in processing such as silicon crystal pulling and fiber optic production contains impurities such as nitrogen, oxygen, water, carbon dioxide, carbon tetrafluoride and chlorine. Because a large volume of argon is used (leading to a corresponding high cost for its use), it is desirable to minimize the amount of argon gas used or develop ways to remove the impurities from such stream, thus recycling the argon gas.

A number of prior art exists relating to the purification of gases, including argon. However, none of the prior art is believed to exist that removes the selected impurities as found in the present invention from an argon rich stream.

U.S. Pat. No. 5,706,674 discloses two embodiments for recycling impure argon effluent from a silicon crystal furnace using cryogenics. Both of these embodiments use catalytic treatments and adsorption in conjunction with their cryogenic process steps to produce a pure argon recycle stream.

U.S. Pat. No. 4,816,237 purifies an argon waste gas by adding a stoichiometrically excess amount of oxygen to the waste gas composition to combust hydrogen and like impurities, and to convert into water and carbon dioxide, adding a stoichiometrically excess amount of a hydrocarbon gas to the resulting gas composition to remove the residual oxygen, and subjecting the resulting gas composition to a pressure swing adsorption-desorption treatment to remove impurities.

U.S. Pat. No. 5,783,162 discloses a three process steps for recovering and purifying argon gas. The steps includes reacting impure argon gas with hydrogen, introducing the impure argon gas into an adsorption unit, and subjecting the impure argon gas to a low temperature liquefaction and introducing the liquefied argon into a rectification unit.

U.S. Pat. No. 6,113,869 discloses purifying an argon gas stream by drying the gas stream with a desiccant, oxidizing the hydrogen and carbon dioxide to water vapor and carbon dioxide by contact with oxidizing catalysts in the presence of excess oxygen, removing the water vapor and carbon dioxide from the gas stream by adsorption, removing excess oxygen by chemisorption at elevated temperature and removing nitrogen and methane by adsorption at cryogenic temperature.

U.S. Pat. No. 6,123,909 discloses a process for purifying argon by adding air or oxygen to the argon to oxidize the carbon monoxide to carbon dioxide in the presence of a catalyst, adding hydrogen into the argon and reacting the oxygen with the hydrogen in the water in the presence of a catalyst, removing the carbon dioxide and water by adsorbent, and distilling the argon.

U.S. Pat. No. 5,100,447 discloses recovering argon from a feed mixture comprising passing the feed mixture through a pressure swing adsorption system, and then passing the argon fraction to a cryogenic fractional distillation system.

U.S. Pat. No. 4,762,542 discloses recovering argon from a tail gas stream by introducing the argon gas that is partially liquefied and introduced into a first fractional distillation column, and then introducing said resulting product from the first fractional distillation into a second fractional distillation.

U.S. Pat. No. 4,752,352 discloses a high yield argon recovering argon from an ammonium synthesis plant purge gas by separating ammonia by adsorption, separating methane and nitrogen by pressure swing adsorption, separating hydrogen for recycle to the ammonia synthesis plant by high pressure distillation or membrane separator, and separation by cryogenic distillation.

U.S. Pat. No. 4,750,925 discloses a process for recovering argon from a gas mixture by treating said mixture in a pressure swing adsorption system, followed by treating through cryogenic distillation.

U.S. Pat. No. 4,689,062 discloses recovering argon from an ammonia synthesis plant by separating ammonia via adsorption, separating by pressure swing adsorbent, separating by cryogenic distillation column.

U.S. Pat. No. 4,687,498 discloses recovering argon from an ammonia synthesis plant purge gas, which comprises separation by a pressure swing adsorption system, separation by a second membrane separator and separation by cryogenic distillation.

U.S. Pat. Nos. 5,125,934 and 5,220,797 discloses recovering argon from a feed mixture comprising purifying the feed mixture, compressing the feed mixture, passing the compressed purified mixture to a pressure swing adsorption system, and distilling the feed mixture in a cryogenic fractional distillation system.

U.S. Pat. No. 5,106,399 discloses an argon purification system comprising an ambient temperature molecular sieve adsorption step, an ambient temperature chemisorption step, and a cryogenic temperature adsorption step, particularly useful with liquefaction of the purified argon.

None of the prior art is believed to teach or suggest the removal of the specific contaminants from an argon stream nor the sequential steps as provided herein for removing the contaminants.

Accordingly, it is an object of this invention to provide a process for purifying and recycling argon by removing selected contaminants from an argon-rich stream.

It is a further object of this invention to provide a process for purifying and recycling argon stream that takes less energy and capital than conventional argon separation processes from air.

SUMMARY OF THE INVENTION

This invention is directed to methods for purifying argon from an impure argon stream.

If the oxygen concentration in the impure argon is less than about 10 mole percent of oxygen, the invention is proceeded in the sequential steps of a) removing chlorine from the impure argon stream; b) adding hydrogen to the impure argon stream; c) removing carbon dioxide and water from the impure argon stream; d) removing hydrogen from the impure argon stream; and e) removing nitrogen from the impure argon stream to form a purified argon stream.

If the oxygen concentration in the impure argon is greater than about 10 mole percent of oxygen, the method comprises the sequential steps of a) removing chlorine from the impure argon stream; b) removing carbon dioxide and water from the impure argon stream; c) removing nitrogen and oxygen from the impure argon stream; d) adding hydrogen to the impure argon stream; e) removing water from the impure argon stream; f) removing hydrogen from the impure argon stream; and g) removing nitrogen from the impure argon stream to form a purified stream.

Optionally, the hydrogen may be recycled in the purification steps, and the resulting argon may be recycled after processing.

More specific embodiments are provided. For example, this invention provides a method for purifying an impure argon stream containing less than about 10 molar percent of oxygen to produce argon comprising the sequential steps of a) passing impure argon to a chlorine adsorbent means to remove chlorine; b) passing the resulting impure argon to a deoxo means in the presence of hydrogen to convert free oxygen to water; c) passing the resulting impure argon to a purifier means to remove water, carbon dioxide and carbon tetrafluoride; d) passing the resulting impure argon to a distillation column to remove nitrogen and hydrogen to produce purified argon.

Also, this invention provides a method for purifying an impure argon stream containing greater than about 10 molar percent oxygen to produce argon comprising the sequential steps of a) passing impure argon to a chlorine adsorbent means to remove chlorine; b) passing the resulting argon to a purifier means to remove water, carbon dioxide and carbon tetrafluoride; c) passing the resulting impure argon to a column to remove most hydrogen, argon and nitrogen; d) passing the resulting impure argon to a deoxo means in the presence of hydrogen to remove free oxygen by producing water; e) passing the resulting impure argon to a purifier means to remove water; and f) passing the resulting impure argon to a column to remove nitrogen and produce purified argon.

As used herein, the term "adsorbent means" refers to either a single bed or a serial arrangement of two beds. The inlet end of a single bed system is the inlet end of the two bed system (arranged in series) and the inlet of the first bed in the system. The outlet end of a single bed system is the outlet end of the single bed and the outlet end of the two bed system is the outlet end of the second bed in the system. The adsorbent may be chosen from a number of materials including activated carbon, silica gel and zeolite molecular sieves (including type 13X). However, the choice of molecular sieves and adsorbent materials are known in the art, and are contemplated in the present invention.

As used herein, the term "deoxo means" refers to any means for removing oxygen. One method used herein is to mix oxygen with hydrogen to produce water, and then to remove the water. There are a number of methods to remove oxygen, and the present invention contemplates the use of other such alternatives for oxygen removal.

As used herein, the term "purifier" refers to any means to purify gas by selectively separating a gas from a mixture producing a resulting gas substantially free from the selected gases.

Figure 1:
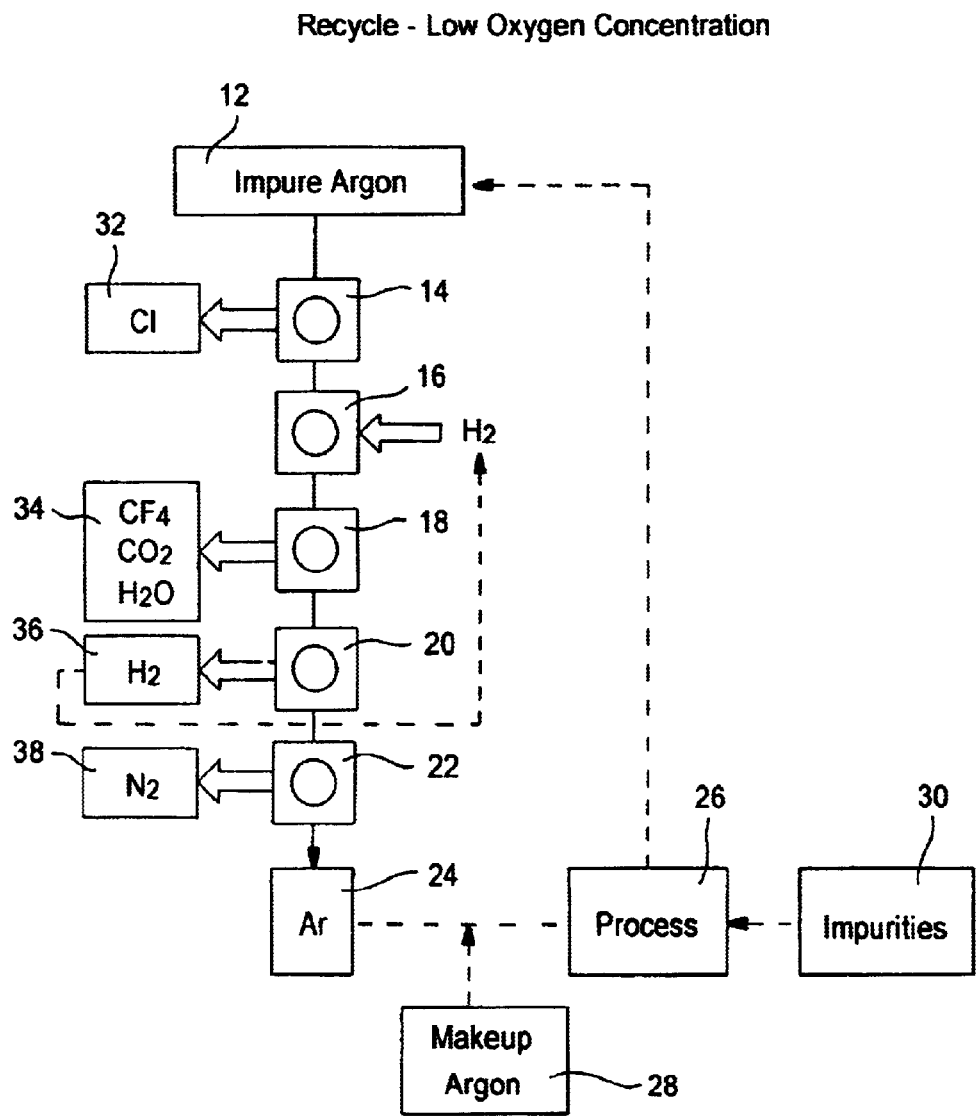
FIG. 1 is a sequence diagram illustrating the purification method of the present invention when the oxygen concentration is less than about 10% in the impure argon.

Other objects, features and advantages will occur to those skilled in the art from the following description of preferred embodiments and the accompanying drawing, in which FIG. 1 provides a schematic diagram of purification method in this invention.

DETAILED DESCRIPTION OF THE INVENTION

The following block flow sequences illustrate the preferred way to remove impurities, namely chlorine, nitrogen, oxygen, water, carbon tetrafluoride and carbon dioxide, from an argon rich stream (see Table 1 for concentrations).

TABLE 1

Concentration ranges

| Component | Molar concentration % |
| --- | --- |
| Argon | 10–98 |
| Nitrogen | 0–75 |
| Oxygen | 0–20 |
| Water | 0–5 |
| Carbon Dioxide | 0–1 |
| Carbon Tetraflouride | 0–10 |
| Chlorine | 0–10 |

FIG. 1 is a sequence diagram illustrating a preferred method to remove the above named impurities when the oxygen molar concentration is less than 10%, but can be used for oxygen molar concentrations as high as 50%. An impure argon stream 12 containing argon, chlorine, nitrogen, oxygen, water, carbon tetrafluoride and carbon dioxide is passed to node 14 (unit operation 14) to remove chlorine 32. Node 16 adds hydrogen above the stoichometric amount necessary to create water with the oxygen impurity. Node 18 removes water, carbon tetrafluoride and carbon dioxide 34. Node 20 removes free hydrogen 36 that did not react with the oxygen impurity. Node 22 removes the nitrogen impurity 38. It is possible to combine node 20 and node 22 into a single unit operation. The unreacted hydrogen 36 is recycled back to node 16, the pure argon 24 is combined with makeup argon 28 and passed back to the process 26, where impurities 30 are again added to the argon stream, this impure argon stream 12 is then passed to node 14.

Figure 2:
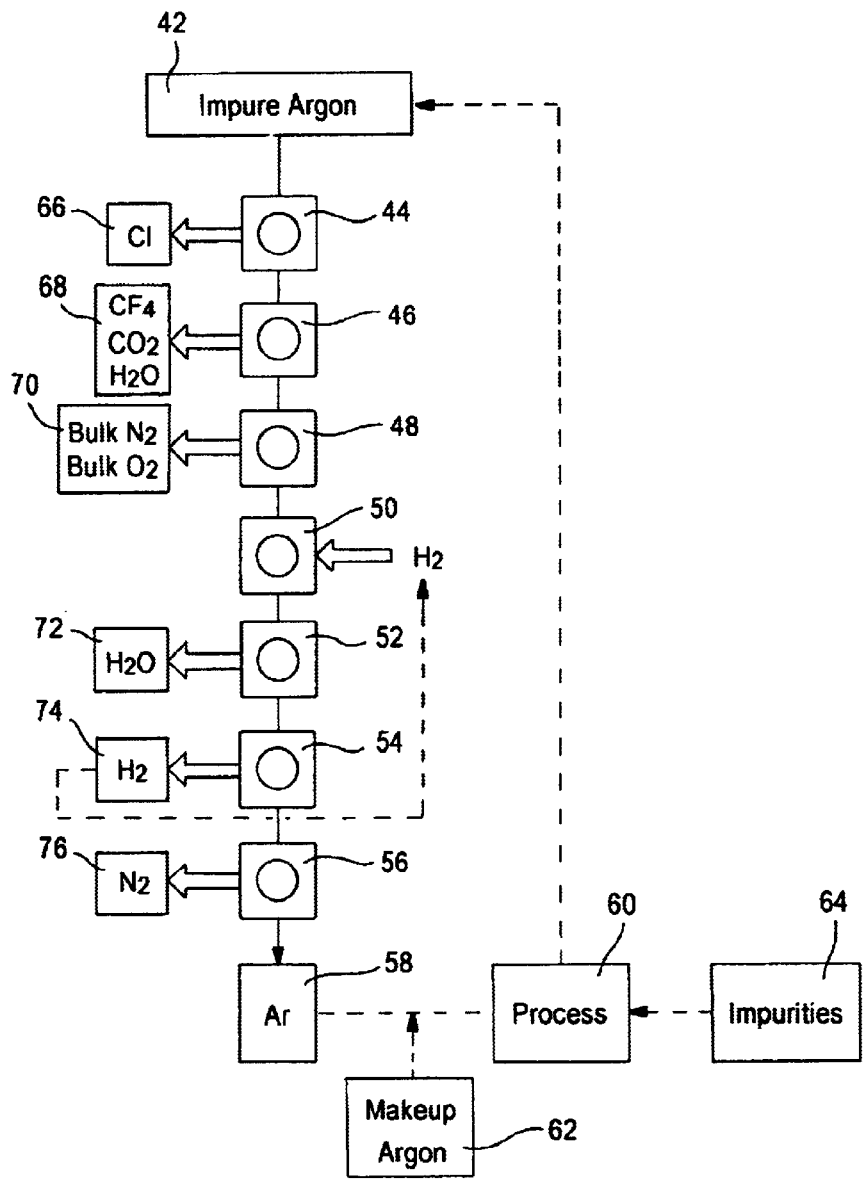
FIG. 2 is a sequence diagram illustrating the purification method of the present invention when the oxygen concentration is greater than about 10% in the impure argon.

FIG. 2 illustrates a preferred method for removing the above last named impurities when the oxygen molar concentration is greater than about 10%. Generally, this method is applicable to purifying impure argon having oxygen molar concentrations as low as 2%. In FIG. 2, an impure argon stream 42 is passed to node 44 where chlorine 66 is removed. The stream is then passed to node 46 where carbon dioxide, carbon tetrafluoride and water are removed. In node 48 bulk nitrogen and bulk oxygen 70 are removed. Node 50 adds hydrogen 74 above the stoichometric amount necessary to create water 72 with the remaining oxygen impurity. Node 52 removes water 72 created in node 50. Node 54 removes free hydrogen 74 that did not react with the oxygen impurity. Node 56 removes the remaining nitrogen impurity 76. Unreacted hydrogen 74 is recycled back to node 50, pure argon 58 is combined with makeup argon 62 and passed back to process 60, where impurities 64 are again added to the argon stream, this impure argon stream is then passed to node 42.

In another embodiment, the invention can be described more specifically as follows. The following cycles illustrates a means of recovering argon from a stream containing argon, chlorine, nitrogen, oxygen, water, carbon tetraflouride, and carbon dioxide. One of the two cycles is ideal depending on the concentration of oxygen in the feed stream.

Figure 3:
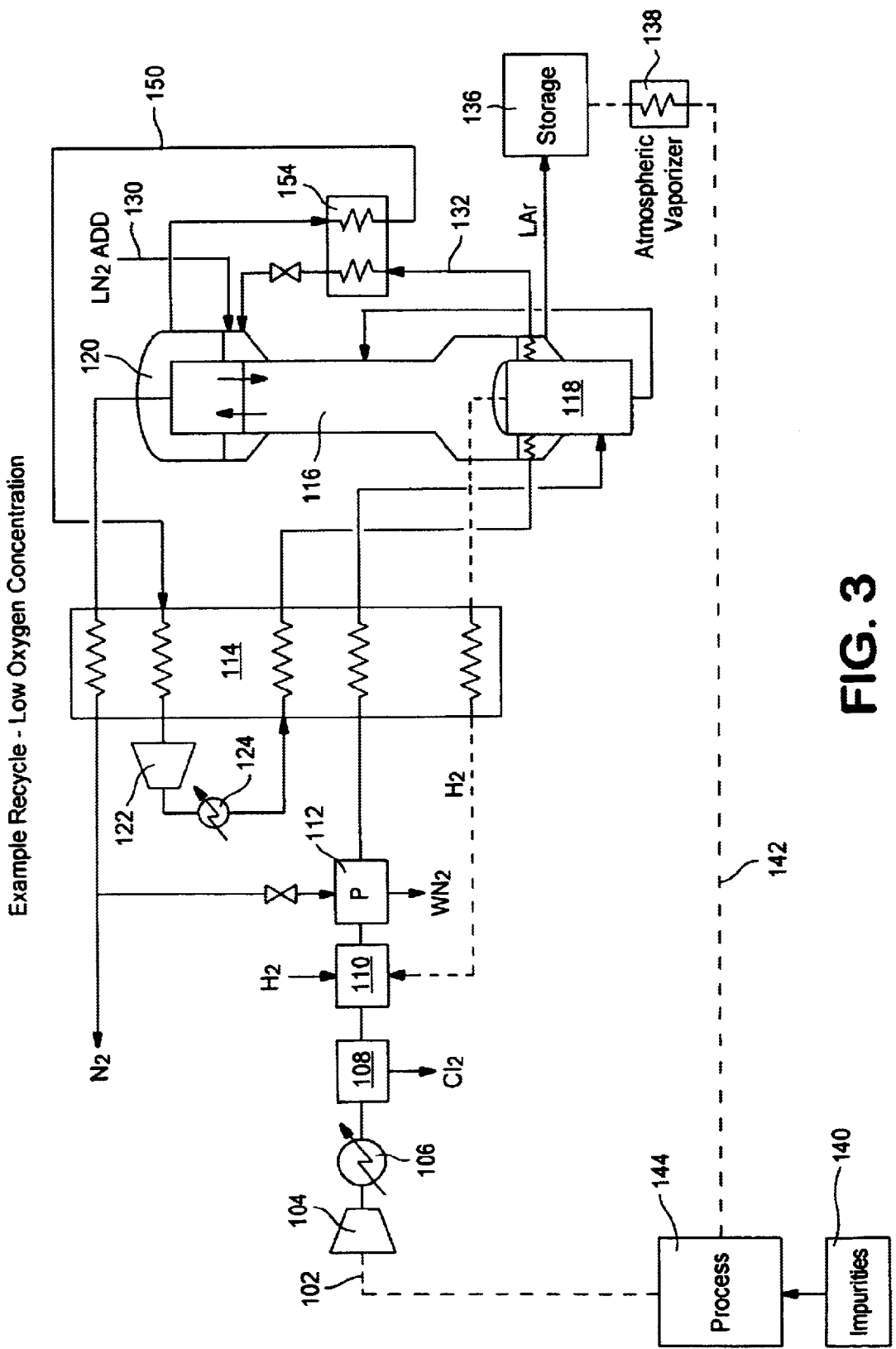
FIG. 3 is a schematic flow diagram of one preferred embodiment of the present invention when the oxygen concentration is less than about 10% in the impure argon.

If the molar concentration of oxygen in the feed stream is less than 10%, then the cycle will have the configuration illustrated in FIG. 3. Stream 102 will be compressed via compressor 104 and then passed to aftercooler 106 where the heat of compression will be rejected to cooling water. The now compressed and cooled stream will be passed to adsorbent bed 108 to remove chlorine. The chlorine free stream is then passed to hydrogen reactor 110 (or series of reactors and intercoolers) where the oxygen impurity will combine with the hydrogen to form water. This stream is then passed to purifier 112 where water carbon dioxide and carbon tetrafluoride will be removed. The stream is then passed to primary heat exchanger 114, where it is cooled against warming nitrogen (or warming product if gaseous argon is required). The argon rich stream is passed to reboiler 118, where it is partially condensed. At this point hydrogen is separated from the stream and optionally recycled back to hydrogen reactor 110. The argon rich stream is then passed to a distillation column 116, where a nitrogen heat pump serves as reboiler 118 (note that the heat pump and the feed stream are both used for this duty) and condenser 120. Nitrogen 150, subcooled nitrogen 132, makeup nitrogen 130, primary heat exchanger 114 and economizer 154 constitute the nitrogen heat pump. Makeup liquid nitrogen 130 and subcooled liquid nitrogen 132 that is expanded from reboiler are passed directly to condenser 120. Vaporized nitrogen from condenser 120 is then warmed up in primary heat exchanger 114 compressed via compressor 122 and then passed to aftercooler 124 where the heat of compression is removed. This stream is then passed to back to primary heat exchanger 114 to be cooled and used as the driving force in reboiler 116. Nitrogen is removed from the top of the column and warmed up in primary heat exchanger 114, then vented to the atmosphere, or used to regenerate the purifier. Liquid argon is drawn from the bottom of the column and passed to storage 136. Argon 142 can then optionally be passed back to process 144 where impurities 140 are again introduced thereby creating the feed to the argon purification. An optional atmospheric vaporizer 138 may be used.

Figure 4:
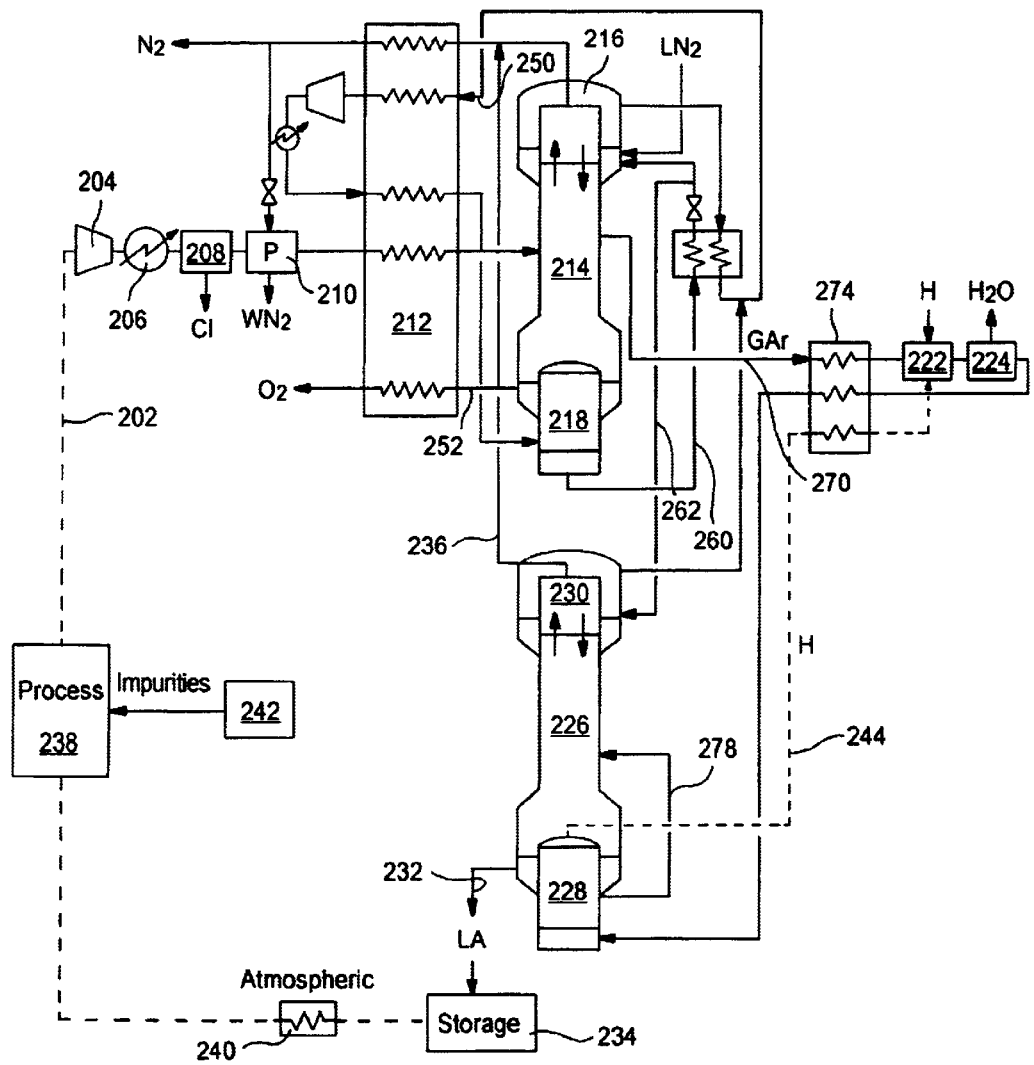
FIG. 4 is a schematic flow diagram of one preferred embodiment of the present invention when the oxygen concentration is greater than about 10% in the impure argon.

If the concentration of oxygen in the feed stream is less than 10% then the cycle will have the configuration illustrated in FIG. 4. Stream 202 is compressed via compressor 204 and then passed to aftercooler 206 where the heat of compression will be rejected to cooling water. Again, the chlorine is removed first from the stream via adsorbent bed 208. The stream is then passed to purifier 210 where water, carbon dioxide and carbon tetraflouride are removed. This stream is then passed to primary heat exchanger 212, where it is cooled against warming oxygen 252 and nitrogen 250. The argon rich stream is then passed to a distillation column where a nitrogen heat pump serves as condenser 216 and reboiler 218. Bulk nitrogen and oxygen are removed via this cryogenic distillation. The argon rich stream is pulled off the column and warmed against oxygen free argon. The argon rich stream is heated via heat exchanger 260 and made oxygen free by the addition of hydrogen to form water in a hydrogen reactor 222 (or other deoxo means), and the removal of water via adsorbent bed 224. The oxygen free argon (with nitrogen and hydrogen) is then passed to reboiler 228 via stream 276 where the excess hydrogen is removed. This stream is then passed to distillation column 226 via stream 278 where the nitrogen and argon are separated. Reboiler 228 is driven by partially condensing argon. Condenser 230 is driven by the nitrogen heat pump. The liquid argon is passed to storage 234 via stream 232, and nitrogen stream 236 is passed to primary heat exchanger 212 and then vented to the atmosphere. The argon can then be passed back to the process 238 via optional atmospheric vaporizer 240, where impurities are again introduced, thereby creating the feed to the argon purification. In addition, free hydrogen 244 from argon reboiler 228 can be captured and recycled back to the hydrogen oxygen reactor 222. Note that nitrogen stream 260, 262 and 230 using economizer 274.

In the embodiment wherein the argon contains oxygen concentration of less than about 10%, the present invention contemplates operability of any argon impurities whose oxygen concentration is less than about 50%.

In the embodiment wherein the argon contains oxygen concentration of greater than about 10%, this invention contemplates operability of any argon impurities whose oxygen concentration is greater than about 2%.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for purifying an impure argon stream containing greater than about 10 mole percent of oxygen, said method comprises the following sequential steps:
    a. removing chlorine from said impure argon stream;
    b. removing carbon dioxide, carbon tetrafluoride and water from said impure argon stream;
    c. removing nitrogen and oxygen from said impure argon stream;
    d. adding hydrogen to said impure argon stream;
    e. removing water from said impure argon stream;
    f. removing hydrogen from said impure argon stream; and
    g. removing nitrogen from said impure argon stream to form a purified stream.

2. The method of claim 1 further comprising recycling hydrogen from step (f) to step (d).

3. The method of claim 1 further comprising
    a. adding make-up argon to the purified argon stream from step (g);
    b. adding impurities for use in said process to produce impure argon; and
    c. recycling said impure argon to purification.

4. The method of claim 1 wherein said impure argon stream comprises argon, nitrogen, oxygen, water, carbon dioxide, carbon tetrafluoride and chlorine.

5. A method for purifying an impure argon stream containing greater than about 10 molar percent oxygen to produce argon comprising the following sequential steps:
   a. passing impure argon to a chlorine adsorbent means to remove chlorine;
   b. passing the resulting argon to a purifier means to remove water, carbon dioxide and carbon tetrafluoride;
   c. passing the resulting impure argon to a column to remove most hydrogen, argon and nitrogen;
   d. passing the resulting impure argon to a deoxo means in the presence of hydrogen to convert free oxygen to water;
   e. passing the resulting impure argon to a purifier means to remove water; and
   f. passing the resulting impure argon to a column to remove nitrogen and produce purified argon.

6. The method 5 wherein said impure argon comprises argon, nitrogen, oxygen, water, carbon dioxide, carbon tetrafluoride and chlorine.

7. The method of claim 5 comprising recycling said removed hydrogen from step (d) to said deoxo means.

8. The method of claim 5 further comprising recycling the purified argon to process and recycling argon to step (a).

9. The method of claim 5 comprising passing the impure argon to a compressor and an aftercooler.

* * * * *